United States Patent
Saad et al.

(10) Patent No.: US 12,483,997 B2
(45) Date of Patent: Nov. 25, 2025

(54) POWER HEADROOM ENHANCEMENTS AND TRIGGERS FOR WAVEFORMS

(71) Applicant: NOKIA TECHNOLOGIES OY, Espoo (FI)

(72) Inventors: Majed Saad, Massy (FR); Marco Maso, Issy les Moulineaux (FR); Oskari Tervo, Oulu (FI); Arto Lehti, Antony (FR); Nhat-Quang Nhan, Reims (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 398 days.

(21) Appl. No.: 18/111,249

(22) Filed: Feb. 17, 2023

(65) Prior Publication Data
US 2024/0284349 A1    Aug. 22, 2024

(51) Int. Cl.
*H04W 52/36*    (2009.01)
*H04W 52/42*    (2009.01)

(52) U.S. Cl.
CPC ......... *H04W 52/365* (2013.01); *H04W 52/42* (2013.01)

(58) Field of Classification Search
CPC .. H04W 52/365; H04W 52/42; H04W 52/146
See application file for complete search history.

(56) References Cited

U.S. PATENT DOCUMENTS

| | | | |
|---|---|---|---|
| 2012/0314665 A1* | 12/2012 | Ishida | H01Q 21/28 370/329 |
| 2018/0368081 A1 | 12/2018 | Akkarakaran et al. | |
| 2020/0068506 A1* | 2/2020 | Liu | H04W 52/365 |
| 2024/0023030 A1* | 1/2024 | Taherzadeh Boroujeni | H04L 27/2646 |
| 2024/0155510 A1* | 5/2024 | Sridharan | H04W 52/365 |
| 2024/0163809 A1* | 5/2024 | Sridharan | H04W 52/325 |
| 2024/0284451 A1* | 8/2024 | Park | H04W 72/0457 |
| 2024/0284478 A1* | 8/2024 | Cozzo | H04W 72/232 |
| 2024/0340812 A1* | 10/2024 | Hu | H04W 72/1268 |
| 2025/0234340 A1* | 7/2025 | Hasegawa | H04L 27/2601 |

FOREIGN PATENT DOCUMENTS

EP    3681208 A1    7/2020

OTHER PUBLICATIONS

Nokia, Nokia shanghai Bell, "Discussion on Approaches and Solutions for NR PUSCH Coverage Enhancement", 3GPP TSG RAN WG1 #103, 3-Meeting, Oct. 26-Nov. 13, 2020, R1-2008703, 15 pages.

(Continued)

*Primary Examiner* — Hoang-Chuong Q Vu
(74) *Attorney, Agent, or Firm* — SQUIRE PATTON BOGGS (US) LLP (57) ABSTRACT

Systems, methods, apparatuses, and computer program products for power headroom enhancements and triggers for waveforms. A method may include determining, an event which triggers a power headroom report to report a headroom between a current user equipment transmission power and a nominal power. The determination may depend at least partially on a configuration of frequency domain spectrum shaping. The method may also include generating a power headroom report based on the event. The method may further include transmitting the power headroom report to a network element.

18 Claims, 8 Drawing Sheets

(56) References Cited

OTHER PUBLICATIONS

Huawei, HiSilicon, "Performance Evaluation for pi/2 BPSK with FDSS", 3GPP TSG RAN WG1 Meeting #88bis, Spokane, USA, Apr. 3-7, 2017, R1-1705060, 8 pages.
Nokia, Alcatel-Lucent Shanghai Bell, "On Spectrum Shaping for Uplink Pi/2 BPSK with DFT-S-OFDM", 3GPP TSG-RAN WG1 #89, Hangzhou, P.R. China, May 15-19-2017, R1-1709002, 3 pages.
Iith, "Further Link Results for p/2 Bpsk DFT-S-OFDM Waveform with Spectrum", 3GPP TSG RAN Wg4 Meeting #85, Reno, USA Nov. 27-Dec. 1, 2017, R4-1714191, 5 pages.
Huawei, HiSilicon, "On the Detection Performance of pi/2-BPSK DFT-s-OFDM with Transparent Shaping", 3GPP TSG-RAN WG4 Meeting #84bis, R4-1710213, 4 pages.
NTT DoCoMo, NEC, Sharp, "DFT-Spread OFDM with Pulse Shaping Filter in Frequency Domain in Evolved UTRA Uplink", 3GPP TSG RAN WG1 #42 on LTE, London, UK, Aug. 29-Sep. 2, 2005, R1-050702, 8 pages.
Extended European Search Report dated Jul. 2, 2024, corresponding to European Patent Application No. 24155160.5-1206.
Cheng et al.; "Discussion on dynamic waveform switching for coverage enhancement;" R1-2210881, 3GPP TSG-RAN WG1 Meeting #111; Nov. 14-18, 2022; XP052221444.
Nasarre et al.; "Enhanced Uplink Coverage for 5G NR: Frequency-Domain Spectral Shaping With Spectral Extension;" IEEE Open Journal of the Communications Society; vol. 2, May 21, 2021; XP011857833.
3GPP TS 38.321 V17.3.0 (Dec. 2022), Technical Specification, "3rd Generation Partnership Project; Technical Specification Group Radio Access Network; NR; Medium Access Control (MAC) protocol specification (Release 17);" Jan. 13, 2023; XP052235211.

\* cited by examiner

| Reported value | Measured quantity value (dB) |
|---|---|
| POWER_HEADROOM_0 | $-23 \leq PH < -22$ |
| POWER_HEADROOM_1 | $-22 \leq PH < -21$ |
| POWER_HEADROOM_2 | $-21 \leq PH < -20$ |
| POWER_HEADROOM_3 | $-20 \leq PH < -19$ |
| POWER_HEADROOM_4 | $-19 \leq PH < -18$ |
| POWER_HEADROOM_5 | $-18 \leq PH < -17$ |
| ... | ... |
| POWER_HEADROOM_57 | $34 \leq PH < 35$ |
| POWER_HEADROOM_58 | $35 \leq PH < 36$ |
| POWER_HEADROOM_59 | $36 \leq PH < 37$ |
| POWER_HEADROOM_60 | $37 \leq PH < 38$ |
| POWER_HEADROOM_61 | $38 \leq PH < 39$ |
| POWER_HEADROOM_62 | $39 \leq PH < 40$ |
| POWER_HEADROOM_63 | $PH \geq 40$ |

FIG. 4

X dBm values represent UE minimum power requirements for PC3 (power class 3)

PC3: 23 dBm
Min requirement

Maximum power reduction (MPR) for power class 3

| Modulation | | Edge RB allocations | MPR (dB) Outer RB allocations | Inner RB allocations |
|---|---|---|---|---|
| DFT-s-OFDM | Pi/2 BPSK | ≤3.5[1] 22.5 dBm | ≤1.2[1] 24.8 dBm | 25.8 dBm ≤0.2[1] |
| | | ≤0.5[2] 22.5 dBm | ≤0.5[2] 22.5 dBm | 23 dBm 0[2] |
| | QPSK | 22 dBm | ≤1 | 23 dBm 0 |
| | 16 QAM | 21 dBm | ≤2 | 22 dBm ≤1 |
| | 64 QAM | 20.5 dBm | ≤2.5 | |
| | 256 QAM | 18.5 dBm | ≤4.5 | |
| CP-OFDM | QPSK | 20 dBm | ≤3 | 21.5 dBm ≤1.5 |
| | 16 QAM | 20 dBm | ≤3 | 21 dBm ≤2 |
| | 64 QAM | 19.5 dBm | ≤3.5 | |
| | 256 QAM | 16.5 dBm | ≤6.5 | |

NOTE 1: Applicable for UE operating in TDD mode with Pi/2 BPSK modulation and UE indicates support for UE capability powerBoosting-pi2BPSK and if the IE powerBoostPi2BPSK is set to 1 and 40 % or less slots in radio frame are used for UL transmission for bands n40, n41, n77, n78 and n79. The reference power of 0 dB MPR is 26 dBm.

NOTE 2: Applicable for UE operating in FDD mode, or in TDD mode in bands other than n40, n41, n77, n78 and n79 with Pi/2 BPSK modulation and if the IE powerBoostPi2BPSK is set to 0 and if more than 40 % of slots in radio frame are used for UL transmission for bands n40, n41, n77, n78 and n79.

POWER HEADROOM ENHANCEMENTS AND TRIGGERS FOR WAVEFORMS

FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to apparatuses, systems, and/or methods for power headroom enhancements and triggers for waveforms.

BACKGROUND

Examples of mobile or wireless telecommunication systems may include the Universal Mobile Telecommunications System (UMTS) Terrestrial Radio Access Network (UTRAN), LTE Evolved UTRAN (E-UTRAN), LTE-Advanced (LTE-A), MulteFire, LTE-A Pro, fifth generation (5G) radio access technology or NR access technology, and/or 5G-Advanced. 5G wireless systems refer to the next generation (NG) of radio systems and network architecture. 5G network technology is mostly based on NR technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the IoT.

SUMMARY

Some example embodiments may be directed to a method. The method may include determining, an event which triggers a power headroom report to report a headroom between a current user equipment transmission power and a nominal power. According to certain example embodiments, the determination may depend at least partially on a configuration of frequency domain spectrum shaping. The method may also include generating the power headroom report based on the event. The method may further include transmitting the power headroom report to a network element.

Other example embodiments may be directed to an apparatus. The apparatus may include at least one processor and at least one memory including computer program code. The at least one memory and computer program code may be configured to, with the at least one processor, cause the apparatus at least to determine, an event which triggers a power headroom report to report a headroom between a current user equipment transmission power and a nominal power. According to certain example embodiments, the determination may depend at least partially on a configuration of frequency domain spectrum shaping. The apparatus may also be caused to generate the power headroom report based on the event. The apparatus may further be caused to transmit the power headroom report to a network element.

Other example embodiments may be directed to an apparatus. The apparatus may include means for determining, an event which triggers a power headroom report to report a headroom between a current user equipment transmission power and a nominal power. According to certain example embodiments, the determination may depend at least partially on a configuration of frequency domain spectrum shaping. The apparatus may also include means for generating the power headroom report based on the event. The apparatus may further include means for transmitting the power headroom report to a network element.

In accordance with other example embodiments, a non-transitory computer readable medium may be encoded with instructions that may, when executed in hardware, perform a method. The method may include determining, an event which triggers a power headroom report to report a headroom between a current user equipment transmission power and a nominal power. According to certain example embodiments, the determination may depend at least partially on a configuration of frequency domain spectrum shaping. The method may also include generating the power headroom report based on the event. The method may further include transmitting the power headroom report to a network element.

Other example embodiments may be directed to a computer program product that performs a method. The method may include determining, an event which triggers a power headroom report to report a headroom between a current user equipment transmission power and a nominal power. According to certain example embodiments, the determination may depend at least partially on a configuration of frequency domain spectrum shaping. The method may also include generating the power headroom report based on the event. The method may further include transmitting the power headroom report to a network element.

Other example embodiments may be directed to an apparatus that may include circuitry configured to determine, an event which triggers a power headroom report to report a headroom between a current user equipment transmission power and a nominal power. According to certain example embodiments, the determination may depend at least partially on a configuration of frequency domain spectrum shaping. The apparatus may also include circuitry configured to generate the power headroom report based on the event. The apparatus may further include circuitry configured to transmit the power headroom report to a network element.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for power headroom enhancements and triggers for waveforms. For example, certain example embodiments may be directed to power headroom enhancements and triggers for frequency domain spectrum shaping-based (FDSS-based) waveforms. As described herein certain example embodiments may provide enhancements that enable higher user equipment (UE) transmit powers by reducing a signal's peak-to-average power ratio (PAPR). Additionally, certain example embodiments may take into consideration spectrum extension for FDSS, and provide means to improve a gNB's ability to control FDSS with SE.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "base station", "cell", "node", "gNB", "network" or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

The technical specifications of the Third Generation Partnership Project (3GPP) describe 5G NR waveforms where modulated symbols and/or reference signals (RSs) may be converted to a waveform, which is a baseband signal before it is mixed to radio frequency (RF) and transmitted over the air-interface. 5G NR describes waveforms including, but not limited to, cyclic prefix orthogonal frequency division multiplexing (CP-OFDM), which may be applicable to both uplink (UL) and downlink (DL). Another example waveform may include discrete Fourier transform spread orthogonal frequency division multiplexing (DFT-s-OFDM), which may be applicable to only UL. In the future, various following waveforms described herein may be applied in both UL and DL. Such waveforms may include, but not limited to, for example, DFT-s-OFDM, DFT-s-OFDM FDSS without SE, and DFT-s-OFDM FDSS with SE.

DFT-s-OFDM may support a single transmission layer (e.g., rank=1) per user, whereas CP-OFDM may support more than one layer (e.g., rank>1). This means that CP-OFDM may offer a higher throughput and capacity than DFT-s-OFDM. In contrast, DFT-s-OFDM may have a lower PAPR than its counterpart, which allows DFT-s-OFDM to be used with a higher transmit power and, thus, offering better coverage. Furthermore, DFT-s-OFDM may be generated by adding a transform precoding block before the processing blocks used for generating CP-OFDM. The transform precoding block may be a fast Fourier transform (FFT) block (e.g., DFT block in FIG. 1) that converts a time domain signal into a frequency domain signal.

FDSS may be paired with or without SE. Although DFT-s-OFDM may offer a lower PAPR compared to CP-OFDM, 5G NR also introduced an FDSS function that may be used to further reduce the PAPR and/or lower cubic metric (CM). This entails further lowering of the maximum power reduction (MPR) and, thus, achieve higher maximum transmission power for coverage enhancement.

Figure 1:
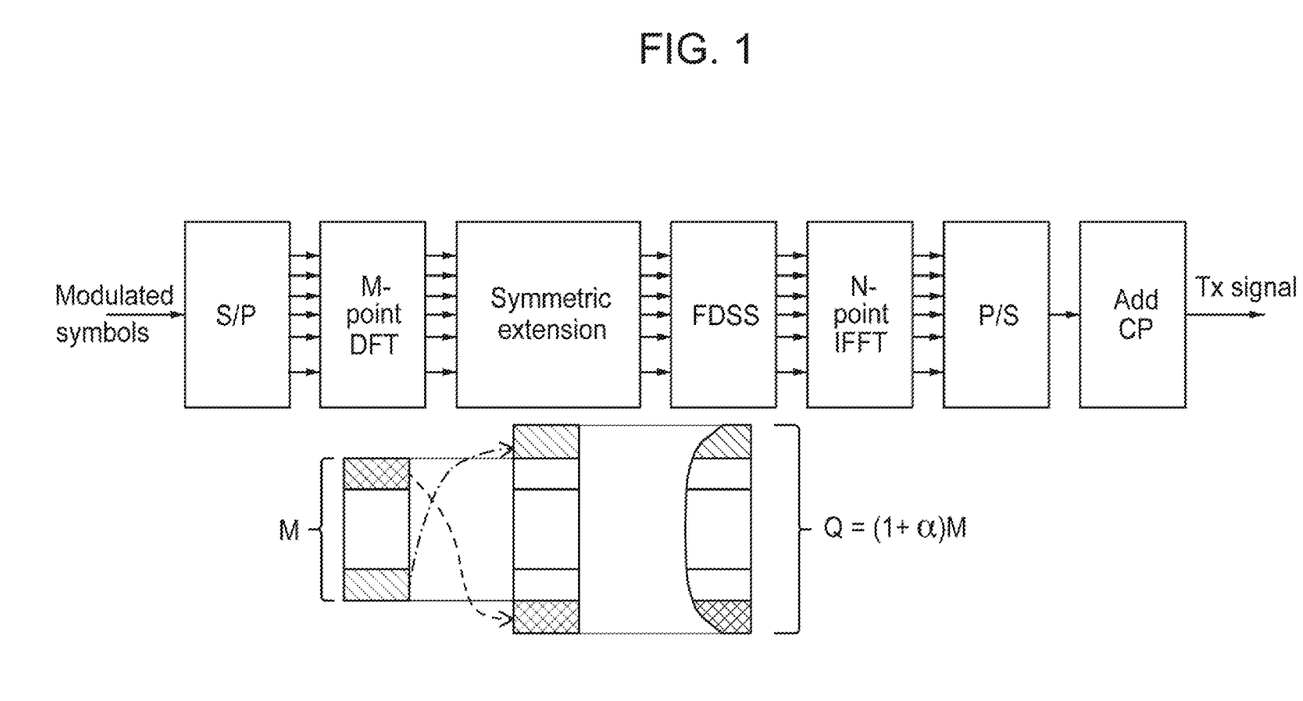
FIG. 1 illustrates an example block-diagram of DFT-s-OFDM transmitter with frequency domain spectrum sharing (FDSS) and spectral extension.

Spectral shaping and SE are two independent techniques. As such, the shaping may be applied with or without SE. FIG. 1 illustrates an example block-diagram of DFT-s-OFDM transmitter with FDSS and spectral extension. As illustrated in FIG. 1, the NR UL transmitter has both frequency domain spectral shaping and SE applied. In spectral shaping, the transition band bins may be weighted by the FDSS function before mapping to the inverse fast Fourier transform (IFFT) input. The FDSS with SE may have an additional cyclic extension block which results in excess-bands.

The block diagram in FIG. 1 includes an in-band size occupied by resource elements (REs) after the DFT-block (i.e., M in FIG. 1). An SE definition is also illustrated in FIG. 1. For example, FIG. 1 also includes an excess-band size corresponding to the amount of REs for SE (i.e., (Q-M) in FIG. 1). The total allocation size may be defined by the in-band size+excess-band size. Further, the total allocation size may include occupied REs after "symmetric extension block" (i.e., Q in FIG. 1). The amount of extension may be expressed by means of an spectral extension factor $\alpha=(Q-M)/Q$ (i.e., excess-band size/total allocation size).

The SE may provide several advantages. For instance, the SE may reduce the PAPR since the effective pulses have a larger time separation. The SE may also reduce the inter-symbol interference caused by the introduction of the FDSS. A further advantage is that since the excess-band carries data, it may or may not be used by the gNB receiver. In case the excess-band is used by the gNB receiver, it may provide further frequency diversity. The shaping function without spectrum entails the existence of a tradeoff between demodulation performance and the Tx power gain, while shaping with SE entails a tradeoff between spectral efficiency and Tx power gain.

In Rel-15, the FDSS without SE for DFT-s-OFDM may be used with pi/2-binary phase shift keying (BPSK) modulation. Given that it may be desirable for Rel-18 to improve the UL coverage, enhancements for other higher order modulation techniques may also be taken into account. FDSS with symmetric SE may be one candidate solution to achieve this objective, and may be an important enabler for coverage improvement in Rel-18.

Figure 2:
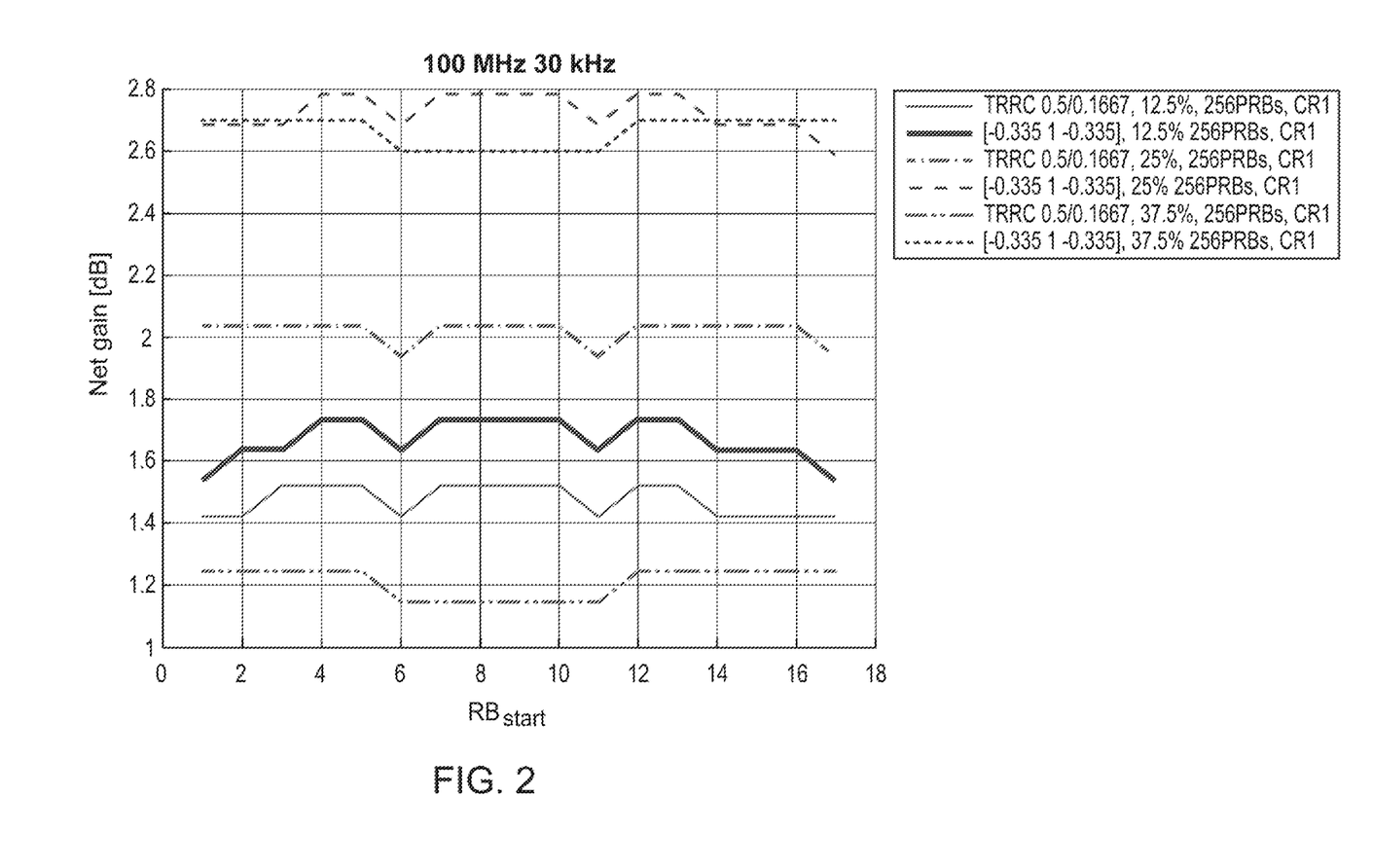
FIG. 2 illustrates an example net (coverage) gain of discrete Fourier transform spread orthogonal frequency division multiplexing (DFT-s-OFDM) with FDSS-spectrum extension (SE).

FIG. 2 illustrates an example net (coverage) gain of DFT-s-OFDM with FDSS-SE over quadrature phase shift keying (QPSK) (without FDSS-SE) with the same spectral efficiency. The QPSK may be for a 256 physical resource block (PRB) transmission for 100 MHz channel bandwidth (BW) with 30 kHz sub-carrier spacing (SCS) for different SE factors, and two different frequency windows (i.e., FDSS filters). It can be seen in FIG. 2 that the FDSS-SE technique may provide close to 3 dB of coverage gain. It may be noted that FIG. 2 considers the extra power available for transmission, and the link performance of the different cases (e.g., legacy and FDSS-SE) with the same spectral efficiency. This means that when SE is used, the coding rate may be increased to compensate for the extra frequency allocation.

UE transmit power for physical uplink shared channel (PUSCH) may be determined by equation (1):

$$P_{PUSCH,b,f,c}(i, j, q_d, l) = \min \begin{Bmatrix} P_{CMAX,f,c}(i) \\ P_{O\_PUSCH,b,f,c}(j) + 10\log_{10}(2^\mu \cdot M_{RB,b,f,c}^{PUSCH}(i)) + a_{b,f,c}(j) \cdot PL_{b,f,c}(q_d) + \Delta_{TF,b,f,c}(i) + f_{b,f,c}(i, l) \end{Bmatrix} [dBm], \quad (1)$$

where the transmission power is capped by $P_{CMAX,f,c}(i)$, which is defined as the UE configured maximum output power. The UE can set the $P_{CMAX,f,c}$ value in each slot, as long as the $P_{CMAX,f,c}$ is set within the bounds:

$P_{CMAX\_L,f,c} \leq P_{CMAX,f,c} \leq P_{CMAX\_H,f,c}$.

In equation (1), $P_{CMAX\_L,f,c}$=MIN $\{P_{EMAX,c}-\Delta T_{C,c}, (P_{PowerClass}-\Delta P_{PowerClass})-\text{MAX}(\text{MAX}(MPR_c+\Delta MPR_c, A-MPR_c)+\Delta T_{IB,c}+\Delta T_{C,c}+\Delta T_{RxSRS}, P\text{-}MPR_c)\}$ and $P_{CMAX\_H,f,c}$=MIN $\{P_{EMAX,c}, P_{PowerClass}-\Delta P_{PowerClass}\}$. The terms in equation (1) are defined in TS38.101-1/38.101-2/38.101-3. It is noted that the gNB is not aware of $P_{CMAX,f,c}(i)$ value that UE uses. However, the gNB knows the upper and lower bound of $P_{CMAX,f,c}(i)$.

Figure 3:
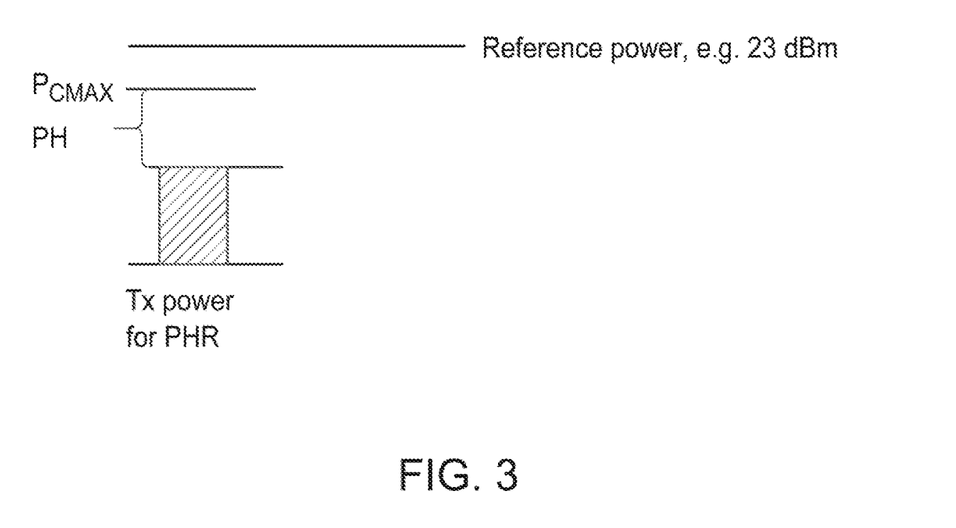
FIG. 3 illustrates an example power headroom using an estimated transmit (Tx) physical uplink shared channel (PUSCH) power.

Power headroom report (PHR) may be a type of medium access control—control element (MAC-CE) that reports the headroom between the current UE Tx power (e.g., estimated power) and the nominal power. The network may use this report value to estimate how much UL BW a UE may use with sufficient power for a specific subframe, and for power control. Additionally, the power headroom may indicate how much transmission power is left for a UE to use in addition to the power being used by a current transmission, as illustrated in FIG. 3. In particular, FIG. 3 illustrates an example power headroom using an estimated Tx PUSCH power. FIG. 3 may be described by formula (2) as follows:

$$\text{Power Headroom} = \quad (2)$$
$$UE \text{ Max Transmission Power} - PUSCH \text{ Total Power} =$$
$$P\_CMAX - P\_pusch.$$

The P-PUSCH total power may consider the whole allocated BW (in the case of FDSS with SE, it may cover both in-band and excess-band).

Figure 4:
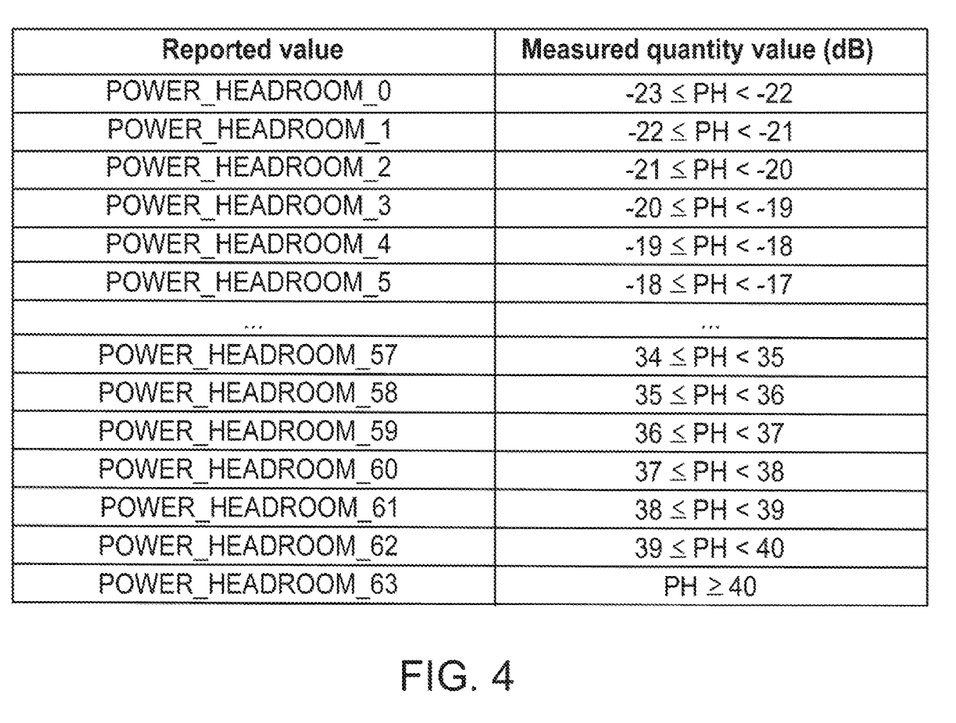
FIG. 4 illustrates an example power headroom report (PHR).

FIG. 4 illustrates an example PHR. In particular, FIG. 4 demonstrates the PHR granularity with a numerical example. As illustrated in FIG. 4, the PHR range may be from −23 . . . +40 dB. FIG. 4 defines the report mapping which may be seen to have 1 dB granularity. In coverage limited scenarios, 1 dB granularity may be considered to be coarse as 1 dB change in Tx power may make a significant difference.

Figure 5:
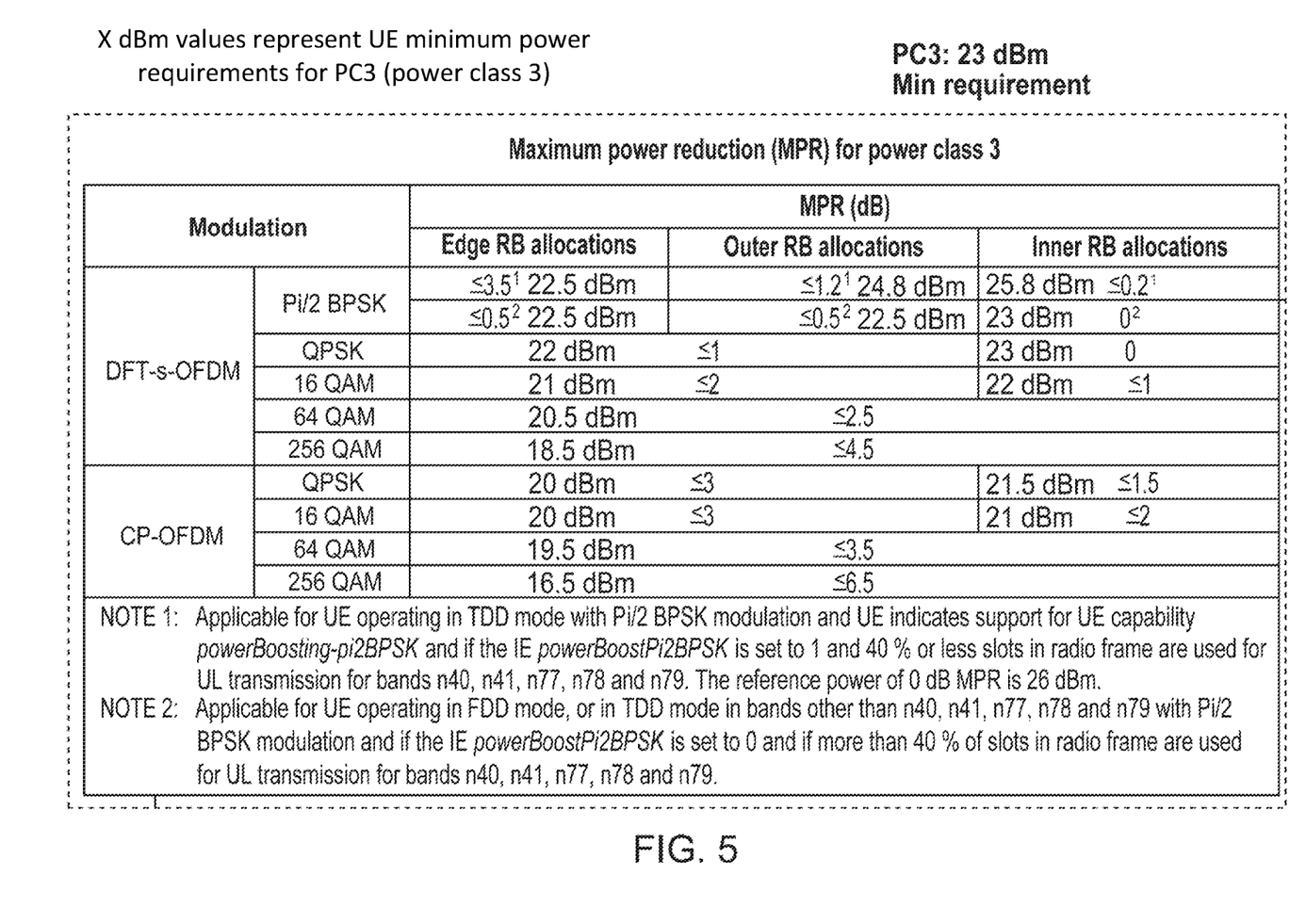
FIG. 5 illustrates an example maximum power reduction (MPR) for user equipment (UE) power class 3.

FIG. 5 illustrates an example MPR for UE power class 3. The table in FIG. 5 represents a frequency range 1 (FR1) scenario and UE power class 3 (i.e., max Tx power may be 23 dBm if no boosting is applied). The MPR is shown in FIG. 5 for different modulation schemes including, for example, for both waveforms and for different resource block (RB) allocations. The first row of DFT-s-OFDM shows the MPR for a UE power boost scenario. Also shown in FIG. 5 are MPR values given by $P_{PowerClass}$-MPR which corresponds to the minimum allowed Tx power in dBm in some cases. In these cases, the actual UE configured maximum output power that the UE can provide may be between the minimum requirement MPR values and 23 dBm (or 26 dBm for UE power boosting).

Figure 6:
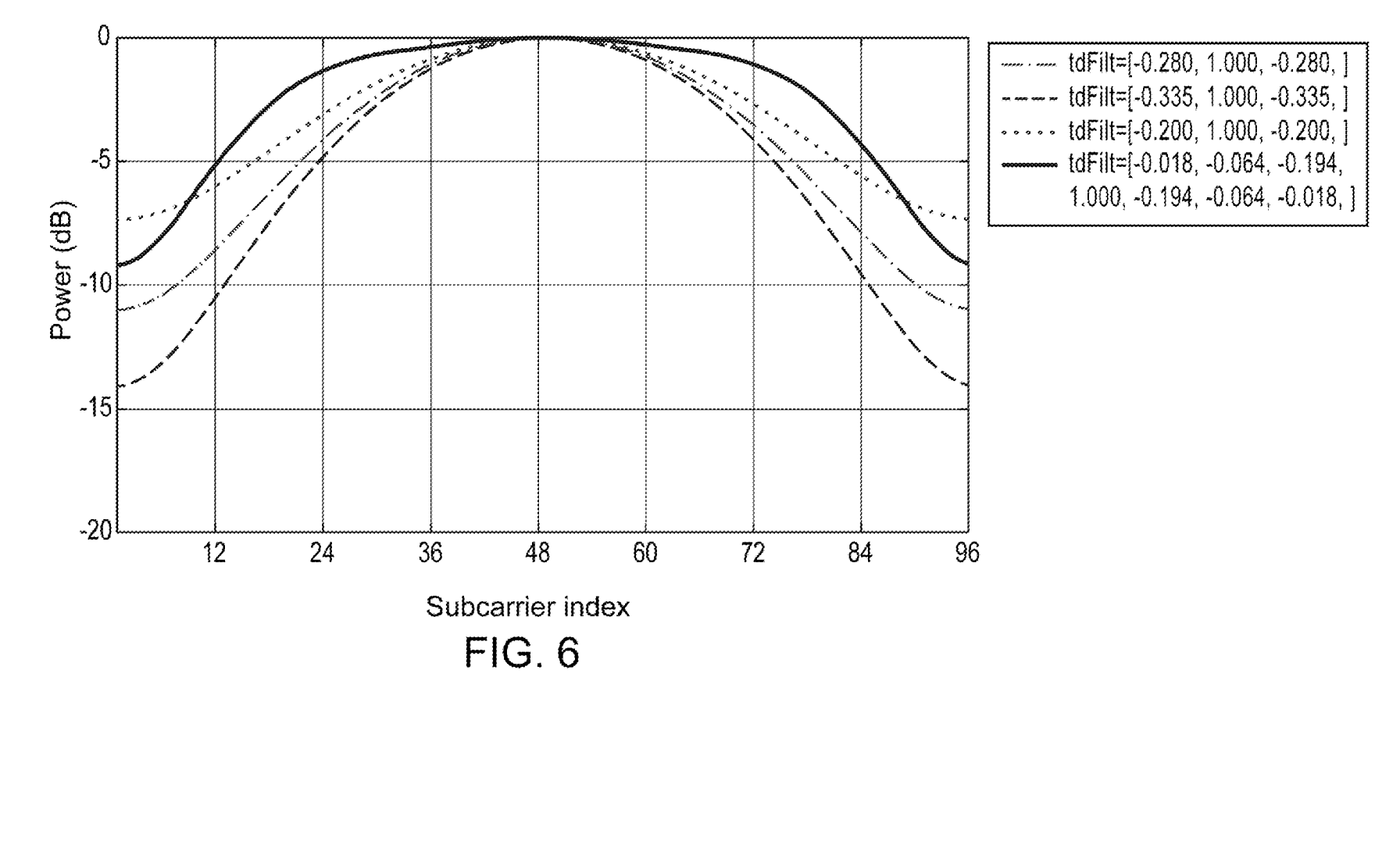
FIG. 6 illustrates an example power spectral density (PSD) for different FDSS filters.

Conventionally, UL performance has exhibited several problems. For instance, there may be a trade-off between Tx performance and Rx performance. FDSS-SE may function to improve the Tx performance. This can be possible at least because FDSS-SE may allow for the reduction of output backoff of the PA (while keeping the same Tx signal quality). However, typically the Rx performance is reduced to some extent due to the FDSS-SE. The net gain combining both Tx and Rx ends may be highly positive, as shown in the example of FIG. 2. Another problem is that the power distribution over different REs is not uniform when FDSS with or without SE is used, as illustrated in FIG. 6. In particular, FIG. 6 illustrates an example power spectral density (PSD) for different FDSS filters satisfying radio frequency (RF) requirements and spectrum flatness requirements.

The filter used for FDSS may be transparent to the gNB, and not defined in the specifications of 3GPP. The UE may use different filters with different configurations (e.g., spectrum extension factor, etc.). Similarly, the gNB may not be aware of a filter power distribution. The actual power levels (function of at least the Tx power indicated to UE via transmit power control (TPC) and max Tx power that UE implementation may provide for a current transmission) may be known only by the UE. Further, the technical specifications of 3GPP only define the requirement for the UE minimum Tx power for a certain MCS.

In view of the above, the gNB may only have access to limited information about the actual UE power conditions. For instance, the quantities known by the gNB may include the maximum power reduction (MPR) requirement and the power headroom report (PHR). The MPR may be defined by RAN4 specifications, which may specify conservative values. Additionally, the PHR, whose resolution may be coarse, may be reported by the UE. Furthermore, the PHR report may relate to the transmission settings and waveform that the UE used for PHR determination, and may differ from power headroom for transmissions to be scheduled. The gNB may receive PHR for a current waveform configuration only in a medium access control—control element (MAC-CE) report, which may be triggered by periodic timers and significant path loss change in legacy 5G NR.

Several problems may arise from the conventional solutions. For instance, there may be a risk of potential incorrect power control commands. In the context of closed loop power control, this may be issued by the gNB if information on filter power distribution is missing at the latter. Another problem is that there may be non-optimal configurations for FDSS-based waveforms. For instance, BW allocation, SE factors (e.g., different filters with different configurations), MCS etc. (e.g., SE or MCS too high/low, reference signals, etc.). A further problem is that there may be sub-optimal advanced receiver operations. This may arise, for example, when the gNB uses, at least partly, the excess band that contains a partial duplicate of the in-band data, as per FDSS-SE design.

In view of the problems discussed above, there is currently no solution to ensure that timely UE assistance information can be provided to the gNB. This aspect may be important to ensure that the optimizations performed by the gNB as a function of the assistance signaling yield the expected performance benefits. As discussed herein, certain example embodiments may resolve the above-described problems in various ways including, for example, defining a set of conditions and operations that need to occur and be performed (respectively). In addition, legacy PHR does not include any information for other possible UE configurations (e.g., multi-SE factor) to help the gNB optimize the waveform selection and its configuration for future transmissions. Further, there are currently no solutions that consider the peculiarities of FDSS with or without SE. This may be needed to solve the above-described problems, which prevent the gNB to best configure the UE transmission power across the allocated spectrum resource, configure the RS allocation decision and power control, and configure receiver operations when SE is used for FDSS-SE.

PHR may be MAC-CE and legacy PHR may not be triggered implicitly by waveform reconfiguration/switching, or explicitly before switching/reconfiguration. In addition, legacy PHR considers only current waveform configurations, and not any other UE possibilities (e.g., SE, filters, waveform mode, etc.). Thus, as described herein certain example embodiments may provide ways to ensure that the UE assistance information on PHR related to FDSS-based waveforms is timely received by the gNB (i.e., on the proper time).

According to certain example embodiments, a set of new events may be interpreted by the UE as explicit/implicit signaling to configure the FDSS-specific assistance signaling. According to other example embodiments, the assistance information on the PHR may include information about the power profile associated with the filters that the UE would use in case any other supported extension factor was configured by the network (NW) (e.g., up to 3 may be supported in Rel-18). This may ensure that the FDSS-specific information carried by the assistance signaling includes relevant information for optimizing future scheduling decisions, by improving the optimality of the decisions taken by the gNB for future PUSCH allocations with FDSS. Thus, according to certain example embodiments, it may be possible to provide PHR enhancements including, for example, information related to other waveform configurations that the UE supports (e.g., SE factors, MCS, RB allocation, RB position (inner or outer), etc.).

In the current 5G NR legacy behavior, PHR may be triggered by certain triggers configured in RRC messages (e.g., RRC connection setup and/or RRC connection reconfiguration. One trigger may be when a path loss change is greater than a certain predefined threshold. The UE may calculate the path loss based on RS power notified to the UE by the network and the measured RS power at the UE antenna port. If the value of the path loss change is greater than the threshold, the UE may transmit the PHR. Another trigger may include expiration of a periodic timer, which may be configured by the gNB in RRC messages. In view of these triggers, the PHR may not be triggered with waveform switching or waveform reconfiguration (e.g., change of SE with FDSS-SE that may lead to filter change at the UE). In contrast, legacy PHR considers the current waveform configuration in the transmission, and it does not include any other information related to other possible UE configurations (e.g., FDSS SE factors, MCS, RB allocation, RB position (inner or outer), etc.).

Certain example embodiments described herein may provide a constructive way of meeting the objective in a straightforward manner. For instance, according to certain example embodiments, it may be possible to provide anticipatory information about the power profile associated with other configurations (e.g., filters, etc.) the UE would use in case any other supported extension factor is configured by the NW.

Currently, the PHR report is the only tool that provides useful information to the NW in the form of coarse estimation of power levels used/usable by the UE over a certain band and for a current UE waveform configuration. This report may be carried by the MAC-CE and may be triggered by events including, for example, a significant path-loss change, and/or a periodic timer expiration. In view of these drawbacks, certain example embodiments may provide an enhanced PHR report that may be prepared and transmitted by the UE in response to certain events. The enhanced PHR report may carry information about the filter power distribution in case of FDSS with or without SE, for instance.

According to certain example embodiments, the enhanced PHR report may be transmitted in response to an explicit trigger through DCI, e.g. format 0_x, or MAC-CE. For example, the NW may request to know whether the configuration of FDSS is sensible (and which parameterization may be used) given current coverage conditions, multi-user pairing needs, and actual power distribution of the filter conveyed by the UE in response to the explicit configuration/trigger.

According to other example embodiments, the enhanced PHR report may be transmitted in response to implicit triggering through any waveform switching and through FDSS (re-)configuration for upcoming PUSCH transmission. In certain example embodiments, the implicit triggering may include any reconfiguration leading to a different power headroom value compared to a previous PHR. In some example embodiments, the waveform switching may correspond to waveform switching to FDSS-based waveforms or reconfiguration (e.g., change of SE factor, etc.). In other example embodiments, the implicit trigger may be initiated by any possible UE change on the Tx parameters including, for example, a change of FDSS filtering or actually used excess-band for the current configuration (the UE may not be mandated to use the whole allocated excess-band).

In view of the above, certain example embodiments may enable the NW/gNB to have full control on the granularity or the power indication report (e.g., an enhanced PHR report), without being constrained for such reports to follow a periodicity that may not be suitable to match scheduling needs and coverage condition variations of each UE. According to certain example embodiments, the power indication report may be automatically triggered by a dynamic switching to a FDSS-based waveform or its reconfiguration. For example, when the indication is based on PHR reports, the PHR report may not be constrained to be periodic if PHR reports in response to path loss changes are deemed insufficient or too coarse by the NW.

According to certain example embodiments, the PHR report may include PHR assuming one or more SE factors to assist selection of the SE factors. That is, in certain example embodiments, the PHR may also include information for other configurations such as SE factors with FDSS-SE that may be used by the UE if FDSS-SE is (re)-configured. The enhancements for PHR may include at least one of 5G NR legacy PHR for the current configuration, and/or a PHR indication assuming other configuration(s) possible by UE (e.g., assuming UE will be configured to use with FDSS-SE with other SE factors known/configured by the NW e.g., 0.125, 0.25, 0.375). In another example embodiment, the configuration may be assuming that BW allocation will be changed from the current configuration to have an integer RB value for known SE factor, or assuming RB allocation will be changed to inner or outer band during reconfiguration, etc. The PHR, for several configurations, may help the NW to decide which configuration (e.g., SE factor) is most suitable to configure during future UL, and allow for the adjustment of power control accordingly during the first transmission. The SE factors may be used for reporting, and may be specified or configured by RRC or signaled by the message triggering the reporting (e.g., DCI or MAC-CE). According to some example embodiments, the PHR may include information about the power profile associated with the filters the UE would use in case any other supported extension factor was configured by the NW. According to other example embodiments, e.g., up to three SE factors may be supported in Rel-18.

In certain example embodiments, the information included in the PHR may be conveyed by the UE. The PHR may include a full power profile associated with the filters that may be used by the UE if a different spectrum extension factor was configured. The full power profile may be signaled directly or differentially with respect to a main signal power profile (the one associated with the configured spectrum extension factor). The main signal power profile may correspond to a legacy 5G-NR PHR considering the total allocated BW, PHR for a specific band segment within the allocated BW (e.g., PHR for in-band), or PHR for a current configuration of the UL transmission. Thus, according to certain example embodiments, the UE may signal the other PHR for other configurations independently, or differentially relative to a reference PHR, which is known for the gNB and the UE. In certain example embodiments, the full power profile may be complemented by information related to how the full power profile would change depending on whether the allocated spectrum for PUSCH is located in the inner or outer region of the carrier.

According to certain example embodiments, the PHR may include, in addition to or separate from the full power profile, a partial power profile associated with the filters that would be used by the UE if a different spectrum extension factor was configured, but limited to a segment band corresponding to the spectrum extension. According to some example embodiments, the partial power profile may be signaled directly or differentially with respect to the main signaled power profile (the one associated with the configured spectrum extension factor). According to other example embodiments, the partial power profile may be complemented by information related to how the full power profile would change depending on whether the allocated spectrum for PUSCH is in the inner or outer region of the carrier.

The addition of the full power profile and/or the partial power profile may ensure that the FDSS-specific information carried by the assistance signaling includes relevant information for optimizing future scheduling decisions and link adaptation.

Figure 7:
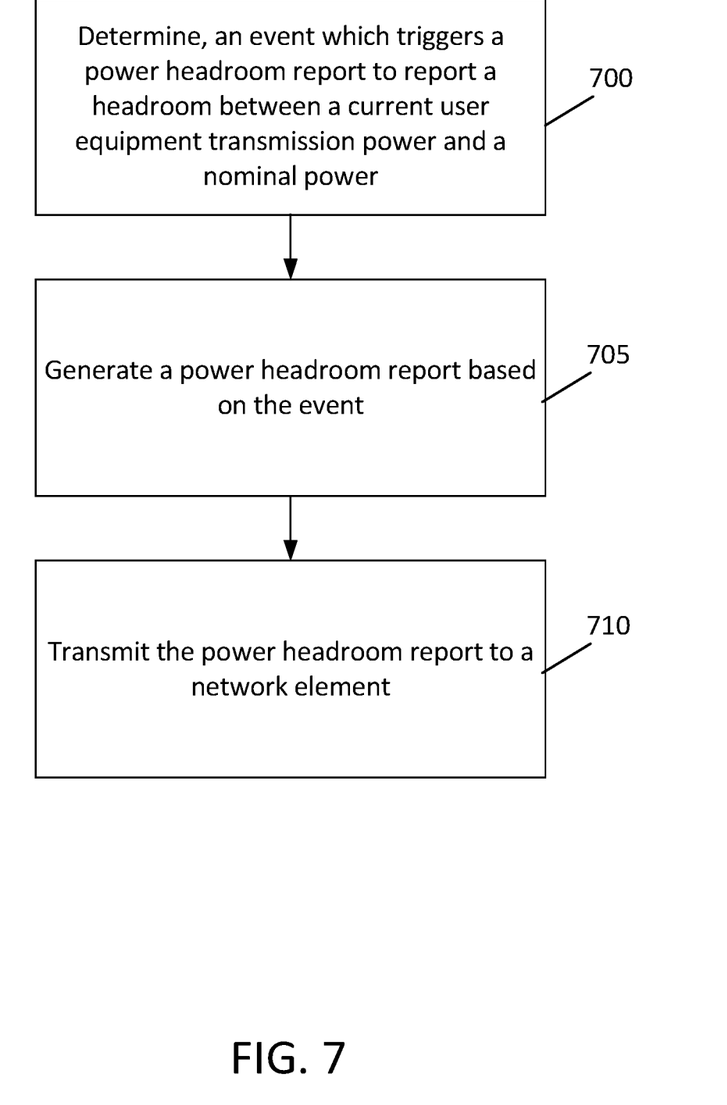
FIG. 7 illustrates an example flow diagram of a method, according to certain example embodiments.

FIG. 7 illustrates an example flow diagram of a method, according to certain example embodiments. In an example embodiment, the method of FIG. 7 may be performed by a network entity, or a group of multiple network elements in a 3GPP system, such as LTE or 5G-NR. For instance, in an example embodiment, the method of FIG. 7 may be performed by a UE similar to one of apparatuses 10 or 20 illustrated in FIG. 8.

According to certain example embodiments, the method of FIG. 7 may include, at 700 determining, an event which triggers a power headroom report to report a headroom between a current user equipment transmission power and a nominal power. According to certain example embodiments, the determination may depend at least partially on a configuration of frequency domain spectrum shaping. The method may also include, at 705, generating a power headroom report based on the event. The method may further include, at 710, transmitting the power headroom report to a network element.

According to certain example embodiments, the determination of the event may be based on an explicit or an implicit indication from the network element. According to some example embodiments, the transmission of the power headroom report may be triggered explicitly via a request from the network element. According to other example embodiments, the transmission of the power headroom report may be triggered implicitly via waveform switching or frequency domain spectrum shaping (re)-configuration for a physical uplink shared channel transmission.

In certain example embodiments, the transmission of the power headroom report may be triggered implicitly by a user equipment change on a transmit parameter. In some example embodiments, the change on the transmit parameter may include a change of frequency domain spectrum shaping filtering, or a used excess band for a current frequency domain spectrum shaping configuration. In other example embodiments, the power headroom report comprises at least one of a power profile indication for a current waveform configuration, or one or more power profile indications for a pre-defined or a pre-configured configuration. In further example embodiments, the power profile indication may be a full power profile covering a total allocated bandwidth or a partial profile covering a band segment within an allocated bandwidth.

Figure 8:
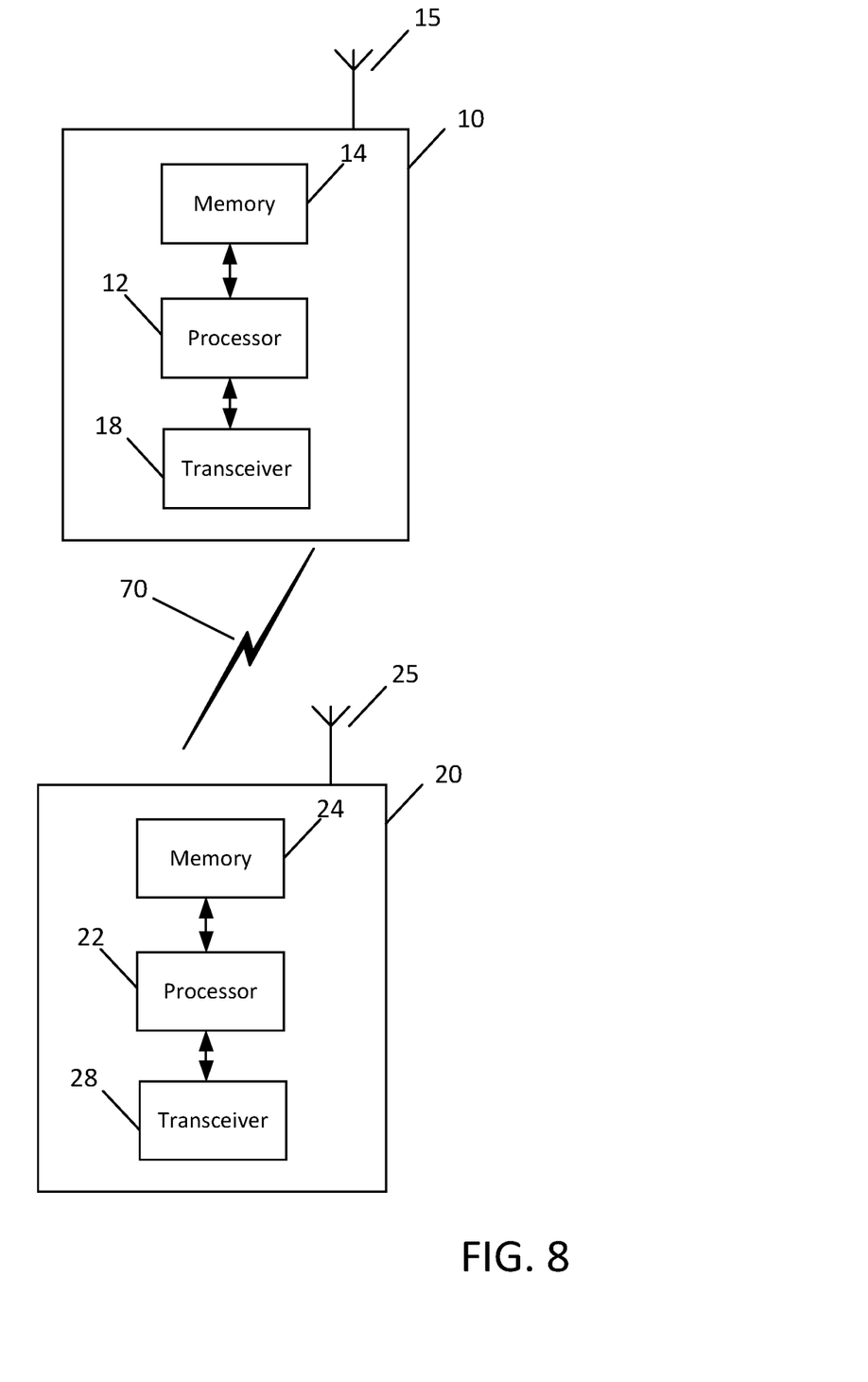
FIG. 8 illustrates a set of apparatuses, according to certain example embodiments.

FIG. 8 illustrates a set of apparatuses 10 and 20 according to certain example embodiments. In certain example embodiments, the apparatus 10 may be an element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 8.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 8.

As illustrated in the example of FIG. 8, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes and examples illustrated in FIGS. 1-7.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods and examples illustrated in FIGS. 1-7.

In some example embodiments, apparatus 10 may also include or be coupled to one or more antennas 15 for receiving a downlink signal and for transmitting via an UL from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an UL.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to determine, an event which triggers a power headroom report to report a headroom between a current user equipment transmission power and a nominal power. Apparatus 10 may also be controlled by memory 14 and processor 12 to generate a power headroom report based on the event. Apparatus 10 may further be controlled by memory 14 and processor 12 to transmit the power headroom report to a network element.

As illustrated in the example of FIG. 8, apparatus 20 may be a network, core network element, or element in a communications network or associated with such a network, such as a gNB, BS, cell, or NW. It should be noted that one of ordinary skill in the art would understand that apparatus 20 may include components or features not shown in FIG. 8.

As illustrated in the example of FIG. 8, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes and examples illustrated in FIGS. 1-6.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods and examples illustrated in FIGS. 1-6.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an UL).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for determining, an event which triggers a power headroom report to report a headroom between a current user equipment transmission power and a nominal power. According to certain example embodiments, the determination may depend at least partially on a configuration of frequency domain spectrum shaping. The apparatus may also include means for generating a power headroom report based on the event. The apparatus may further include means for transmitting the power headroom report to a network element.

Certain example embodiments described herein provide several technical improvements, enhancements, and/or advantages. For instance, in some example embodiments, it may be possible to assist the gNB in selecting a preferred receiver strategy and usage of FDSS SE. In doing so, it may be possible to maximize the link budget, that is the coverage or data rate for FDSS-based waveforms. For instance, the link budget may be maximized by assisting the gNB in selecting a best waveform and FDSS-SE configuration (e.g., SE factor) when the trigger(s) for multiple SE PHR indications is performed. By assisting the gNB in this manner, it may be possible to avoid high spectral efficiency degradation with a large SE factor, and avoid lower coverage due to improper configuration. The link budget may also be maximized by appropriately adjusting the power control and BW allocation according to the real available transmit power considering the non-uniform power over REs with FDSS with or without SE. In addition, the link budget may be maximized by determining the useful segment of the excess band with FDSS-SE, if any, to use in the gNB receiver partly/completely for best performance-complexity tradeoff.

In other example embodiments, it may be possible to keep the current PHR definitions unchanged for backward compatibility, and trigger the transmission of additional complementary information on a timely manner to allow the gNB to optimize its decisions. It may further be possible to ensure timeliness of the gNB's actions and decisions as a result of the FDSS-specific report trigger event, which minimizes optimal scheduling and link adaptation latency, and maximizes the coverage and/or data rates. In further example embodiments, it may be possible to minimize or avoid unnecessary periodic PHR reports by adding the additional FDSS-specific report. Certain example embodiments may also enable the UE to keep its FDSS implementation as confidential, and only power profile of the filters is disclosed. Additionally, certain example embodiments may allow the gNB to enhance coverage by adapting reference signals or other configurations, if any, in a timely manner according to a UE specific filter power distribution with a specific SE factor.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary:
3GPP 3rd Generation Partnership Project
5G 5th Generation
5GCN 5G Core Network
5GS 5G System
BD Blind Detection
BPSK Binary Phase Shift Keying
BW Bandwidth
CE Control Element
CP-OFDM Cyclic Prefix OFDM
DCI Downlink Control Information
DCI Format 0_1 UL Grant Configurable by RRC
DFT-s-OFDM Discrete Fourier Transform Spread Orthogonal Frequency Division Multiplexing
eNB Enhanced Node B
E-UTRAN Evolved UTRAN
FDSS Frequency Domain Spectrum Shaping
gNB 5G or Next Generation NodeB
LTE Long Term Evolution
MAC Medium Access Control
MCS Modulation and Coding Scheme
MPR Maximum Power Reduction
NB Narrowband
NR New Radio
NW Network
OFDM Orthogonal Frequency Division Multiplexing
PDU Protocol Data Unit
PRB Physical Resource Block
PHR Power Headroom Report
PUSCH Physical Uplink Shared Channel
QPSK Quadrature Phase Shift Keying
RB, PRB Resource Block, Physical RB
RE Resource Element
RRC Radio Resource Control
Rx Receiver
S/P Serial-to-Parallel
SR Scheduling Request
TPC Transmit Power Control
TS Technical Specification
Tx Transmit
UE User Equipment
UL Uplink
WI Work Item

We claim:

1. A method, comprising:
   determining, an event which triggers a power headroom report to report a headroom between a current user equipment transmission power and a nominal power, wherein the determination depends at least partially on a configuration of frequency domain spectrum shaping;
   generating the power headroom report based on the event; and
   transmitting the power headroom report to a network element.

2. The method according to claim 1, wherein the determination of the event is based on an explicit or an implicit indication.

3. The method according to claim 2, wherein the transmission of the power headroom report is triggered explicitly via a request from the network element.

4. The method according to claim 2, wherein the transmission of the power headroom report is triggered implicitly via waveform switching or frequency domain spectrum shaping (re)-configuration for a physical uplink shared channel transmission.

5. The method according to claim 2,
wherein the transmission of the power headroom report is triggered implicitly by a user equipment change on a transmit parameter, and
wherein the change on the transmit parameter comprises a change of frequency domain spectrum shaping filtering, or a used excess band for a current frequency domain spectrum shaping configuration.

6. The method according to claim 1, wherein the power headroom report comprises at least one of the following:
a power profile indication for a current waveform configuration, or
one or more power profile indications for a pre-defined or a pre-configured configuration,
wherein the power profile indication is a full power profile covering a total allocated bandwidth or a partial profile covering a band segment within an allocated bandwidth.

7. An apparatus, comprising:
at least one processor; and
at least one memory comprising computer program code,
the at least one memory and the computer program code configured to, with storing instructions that, when executed by the at least one processor, cause the apparatus at least to:
determine, an event which triggers a power headroom report to report a headroom between a current user equipment transmission power and a nominal power, wherein the determination depends at least partially on a configuration of frequency domain spectrum shaping;
generate the power headroom report based on the event; and
transmit the power headroom report to a network element.

8. The apparatus according to claim 7, wherein the determination of the event is based on an explicit or an implicit indication.

9. The apparatus according to claim 8, wherein the transmission of the power headroom report is triggered explicitly via a request from the network element.

10. The apparatus according to claim 8, wherein the transmission of the power headroom report is triggered implicitly via waveform switching or frequency domain spectrum shaping (re)-configuration for a physical uplink shared channel transmission.

11. The apparatus according to claim 8,
wherein the transmission of the power headroom report is triggered implicitly by a user equipment change on a transmit parameter, and
wherein the change on the transmit parameter comprises a change of frequency domain spectrum shaping filtering, or a used excess band for a current frequency domain spectrum shaping configuration.

12. The apparatus according to claim 7, wherein the power headroom report comprises at least one of the following:
a power profile indication for a current waveform configuration, or
one or more power profile indications for a pre-defined or a pre-configured configuration,
wherein the power profile indication is a full power profile covering a total allocated bandwidth or a partial profile covering a band segment within an allocated bandwidth.

13. A computer program embodied on a non-transitory computer readable medium, the computer program comprising computer executable code which, when executed by a processor, causes the processor to:
determine, an event which triggers a power headroom report to report a headroom between a current user equipment transmission power and a nominal power, wherein the determination depends at least partially on a configuration of frequency domain spectrum shaping;
generate the power headroom report based on the event; and
transmit the power headroom report to a network element.

14. The computer program according to claim 13, wherein the determination of the event is based on an explicit or an implicit indication.

15. The computer program according to claim 14, wherein the transmission of the power headroom report is triggered explicitly via a request from the network element.

16. The computer program according to claim 14, wherein the transmission of the power headroom report is triggered implicitly via waveform switching or frequency domain spectrum shaping (re)-configuration for a physical uplink shared channel transmission.

17. The computer program according to claim 14,
wherein the transmission of the power headroom report is triggered implicitly by a user equipment change on a transmit parameter, and
wherein the change on the transmit parameter comprises a change of frequency domain spectrum shaping filtering, or a used excess band for a current frequency domain spectrum shaping configuration.

18. The computer program according to claim 13, wherein the power headroom report comprises at least one of the following:
a power profile indication for a current waveform configuration, or
one or more power profile indications for a pre-defined or a pre-configured configuration,
wherein the power profile indication is a full power profile covering a total allocated bandwidth or a partial profile covering a band segment within an allocated bandwidth.

* * * * *